United States Patent [19]

Glaser

[11] Patent Number: 5,404,904

[45] Date of Patent: Apr. 11, 1995

[54] ADJUSTABLE CONTROL VALVE WITH LIMITED ADJUSTMENT RANGE AND SELF LOCKING MEANS

[75] Inventor: Michael D. Glaser, Brookfield, Wis.

[73] Assignee: Cooper Industries, Inc., Houston, Tex.

[21] Appl. No.: 126,454

[22] Filed: Sep. 24, 1993

[51] Int. Cl.$^6$ ............................................. F16K 17/06
[52] U.S. Cl. ................................................... 137/539
[58] Field of Search ..................... 137/539, 539.5, 540

[56] References Cited

U.S. PATENT DOCUMENTS

| | | | |
|---|---|---|---|
| 1,305,964 | 6/1919 | Dickson | 137/539 X |
| 2,470,372 | 5/1949 | Roth | 137/539.5 |
| 2,480,108 | 8/1949 | Barker | 137/539 X |
| 2,891,121 | 6/1959 | Date | 200/89 |
| 2,926,228 | 2/1960 | Date et al. | 200/89 |
| 3,030,476 | 4/1962 | Date et al. | 200/150 |
| 3,297,049 | 1/1967 | Moskovitz | 137/539 X |
| 3,945,795 | 3/1976 | Townsend | 137/539 X |

OTHER PUBLICATIONS

Cooper Industries/McGraw–Edison Power Systems Service Information, No. S280–10–1, "Reclosers, Type H, Single Phase, Maintenance Instructions," Jan. 1970.
McGraw–Edison Power Systems Reference Data, No. R280–10–1, "Reclosers, Types H, 4H, V4H (Single Phase); Types 6H and V6H (Three–Phase); Series–Tip Solenoid Hydraulic Control Mechanism," Mar. 1981.
McGraw–Edison Power Systems Service Information, No. S280–10–3, "Reclosers, Types 4H and V4H Maintenance Instructions," Sep. 1983.
Lexington Switch & Controls, Bulletin 2HR–1, "Lexington Single and Three–Phase Type HR Oil Circuit Reclosers," 1981.

*Primary Examiner*—Robert G. Nilson
*Attorney, Agent, or Firm*—Gregory L. Maag; Conley, Rose & Tayon

[57] ABSTRACT

The control valve includes a spring refiner which is threadly retained in the valve body and which may be adjusted so as to incrementally vary the hydraulic pressure required to open the valve. The valve additionally includes stops or limits so as to prevent the spring retainer from being grossly misadjusted which, when used in the hydraulic control system of the recloser, may cause undesirable miscoordination with the operation of other circuit breakers and protective devices. The valve additionally includes a self-locking mechanism to prevent the valve from falling out of adjustment due to vibration or improper handling.

12 Claims, 5 Drawing Sheets

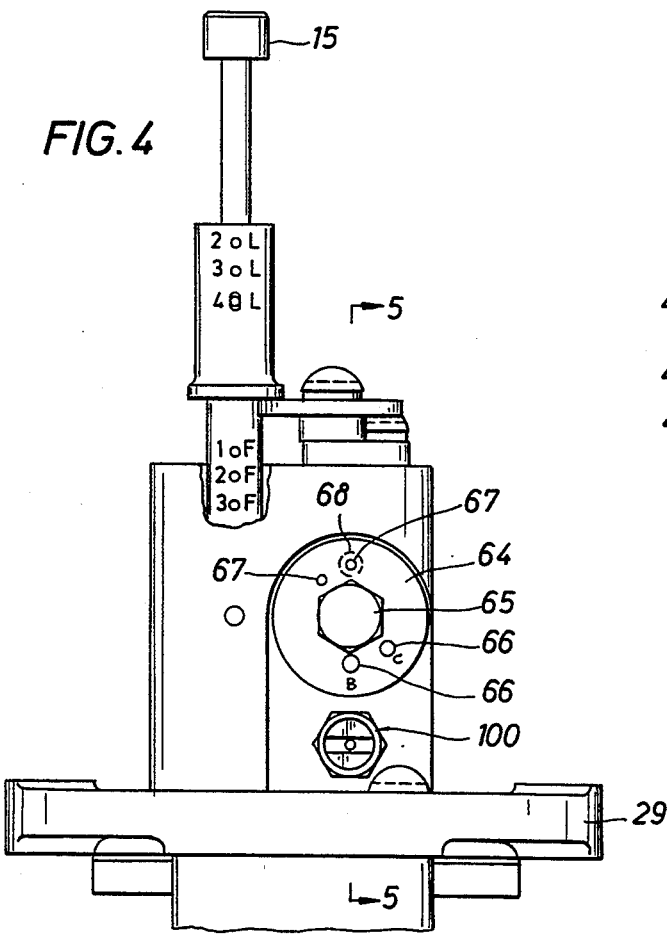
FIG. 4
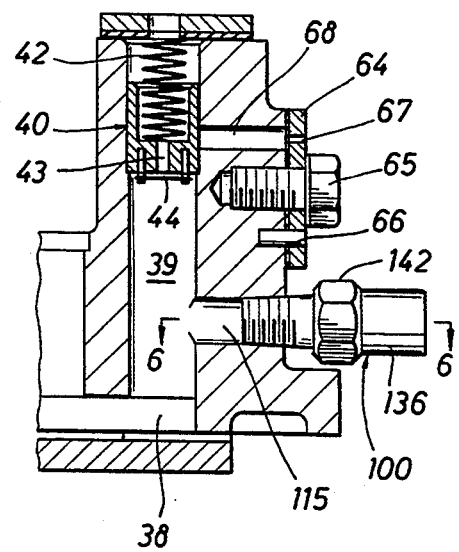
FIG. 5
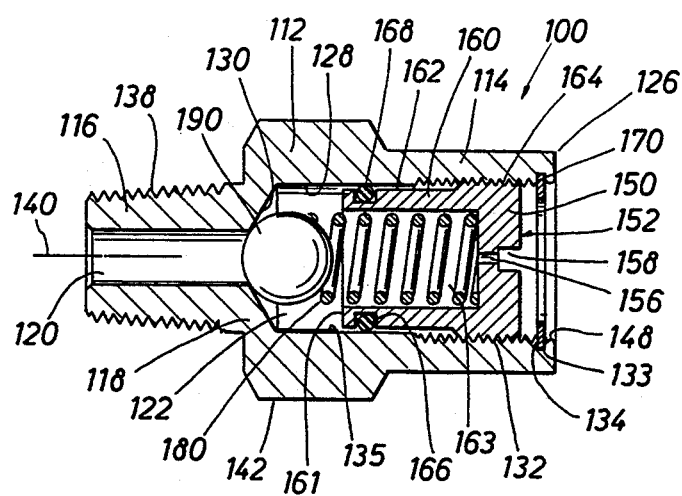
FIG. 6
FIG. 7

ADJUSTABLE CONTROL VALVE WITH LIMITED ADJUSTMENT RANGE AND SELF LOCKING MEANS

BACKGROUND OF THE INVENTION

This invention relates generally to control valves, and more particularly, to adjustable valves for controlling the flow of hydraulic fluids. Still more particularly, the invention relates to control valves having a limited range of adjustment and a self locking means to prevent the valve from becoming out of adjustment. The invention has particular application in the hydraulic control circuit of a recloser, an apparatus used in the distribution of electrical power.

In general, a recloser is a circuit breaking or interrupting device used in the distribution of three phase or single phase electrical power. Like a circuit broker, when a fault or other system disturbance is detected on the circuit, the recloser operates to physically separate the current-carrying contacts in each phase of the circuit, thereby opening the circuit and preventing the continued flow of current.

A recloser differs from a circuit brier in that a circuit broker generally opens a circuit and maintains the circuit in the open position for a relatively long period of time, while a recloser operates to automatically open and reclose the circuit several times in quick succession according to a predetermined pattern or sequence. By momentarily opening and then reclosing the circuit, the recloser allows temporary faults repeated chances to clear or be cleared by subordinate protective devices. Should the fault not clear after the recloser has completed its programmed sequence of open and reclose operations, the recloser recognizes the condition as a permanent fault and locks the circuit open. In cooperation with the various other protective devices, the recloser thus has the ability to distinguish between temporary and permanent faults on a circuit. The use of a recloser to reclose a circuit several times often eliminates the need to take a circuit out of service when the fault or disturbance on the line was of a momentary duration only.

A typical recloser includes three major subsystems: (1) a control system for detecting the presence of an overcurrent and for initiating and scheduling the sequence of opening and closing operations; (2) the interrupters, which function to open and close a set of current carrying contacts in each phase of the circuit; and (3) the operating mechanism which provides the energy necessary to open or close the contacts. A mechanical linkage connects the interrupters and the operating mechanism.

The proper operation of an electrical power system includes maintaining the optimal time-current coordination between all the protective devices that are located between the load and the power source. To properly coordinate these devices, a study is made comparing the time it takes the individual devices to operate when specific levels of current pass through the protective devices.

The objective of the coordination study is to determine those characteristics, ratings, and settings for the overcurrent protective devices that will ensure that the minimum unfaulted load is interrupted when the protective devices operate to isolate a fault or overload anywhere in the system. At the same time, the devices and settings selected must provide satisfactory protection against overloads on the equipment, and must interrupt short circuits as rapidly as possible.

Every protective device includes a time-current characteristic trip curve. When making a coordination study, the time-current characteristic curves of all the various protective devices in the circuit are plotted together. A certain time interval is maintained between the curves in order to ensure the correct sequential operation of the devices. These intervals arc required because the protective devices include various speeds of operation and tolerances.

Like other circuit opening and closing devices, the time-current tripping characteristic of the recloser must be carefully coordinated with the other protective relays, fuses, and circuit breakers, both upstream and downstream from the recloser. Such coordination is desirable so that the circuit breakers and protective devices closest to the fault will operate before the more remotely positioned devices. In order to properly coordinate a particular recloser with other protective devices in the system, it is imperative that the recloser have a predictable time-current trip characteristic throughout its entire expected fault current range.

A recloser is typically installed in electrical distribution systems in a main or branch line that supplies subsidiary lines which, in many instances, are protected by fuses. The recloser is generally pre-adjusted to first execute a sequence of one or two fast opening and reclosing operations in the event that a fault occurs downstream of the recloser. During this sequence, many transient faults will clear themselves before the downstream fuse has time to operate. Based on the available fault current, a particular recloser is chosen and adjusted such that the time for opening the circuit during these fast trip operations is faster than the melting time-current characteristic of the fuse, so that the recloser itself is relied upon for attempting to clear the fault without damage to the fuse.

Where the fault does not clear during such a fast opening sequence, the recloser automatically changes its time-current characteristic such that subsequent opening operations are delayed for a time that is sufficient for the downstream fuse to melt and open the faulted circuit. If the downstream fuse melts and thereby clears the fault, or if the fault clears for any other reason during any of the successive operations, the recloser closes and maintains power on the line. If the fault does not clear during the total sequence of fast and delayed opening operations, the recloser opens a final time and automatically locks out the protected line from its source.

A conventional recloser is supplied with a fast or non-delayed time-current characteristic trip curve, and usually at least two delayed or retarded trip curves. Depending upon the coordination requirements dictated by the protective devices upstream and downstream from the recloser, one of the two available delayed characteristic curves is selected before the recloser is placed in service. Once selected, it is important for the customer to be assured that the device will operate in accordance with the selected time-current characteristic curve so that coordination of the protective devices is maintained. As stated above, such coordination ensures that the smallest possible portion of the electrical distribution network will become de-energized when a fault exists so the customers on unfaulted lines on remote parts of the network will be unaffected and will not be inconvenienced.

Although prior art reclosers have been used successfully for many years, the reclosers have not always provided optimum precision and uniformity with respect to their time-current trip characteristics. Variations in these characteristics result from irregularities in manufacturing tolerances and unpredictable dynamics over a widely varying range of currents between the minimum trip current setting and the maximum fault current interrupting rating of the recloser.

The control system in many present day reclosers operates hydraulically. In conventional hydraulically controlled reclosers, the time it takes for the recloser to open the contacts in the interrupters, as well as the time delay for the delayed operations, are controlled by the degree to which the flow of hydraulic fluid in the controller is restricted. Although explained in more detail below, when the delayed trip is desired, the flow of hydraulic fluid is restricted by the sizes of orifices in various ports and valves. The sizes of the orifices are predetermined by design criteria and then manufactured in accordance with that design. Unfortunately, given the manufacturing tolerances of the components which comprise the hydraulic control system, as well as variances in the springs that are employed in various control valves or metering devices, the recloser control system, after manufacture or after extended use in the field, may not provide the precise metering of hydraulic fluid that is necessary to provide the exact time-current characteristic curve desired.

When such reclosers originally became available and were placed in service, they included no way to adjust or alter the flow of hydraulic fluid to compensate for varying manufacturing tolerances or changes to the hydraulic system that occurred over time. In the more recent past, manufacturers have produced devices intended to provide the adjustment previously lacking. The devices, generally known as timing blocks, were "add-on" devices which replaced original components of the recloser. The timing blocks included bores which were aligned with exit ports or orifices in the recloser hydraulic control system. The flow of hydraulic fluid through these bores was controlled by the use of spring-loaded adjustment screws. As designed, the timing blocks permitted incremental adjustments so as to increase or decrease the size of the conduit through which the hydraulic fluid passed in order to more precisely meter the flow. Theoretically, such designs would permit adjusting the flow of hydraulic fluid so as to yield the desired time-current characteristic curve.

The theory of using adjustable timing blocks had merit and the blocks themselves have been employed with varying measures of success. Nevertheless, significant disadvantages and liabilities exist with their use.

First, the timing blocks were relatively large. Once installed in the recloser, the blocks protruded so far as to significantly decrease the dielectric clearances that are required for proper and safe operation of the recloser. This decrease in clearance greatly increased the likelihood of flashovers occurring within the tank of the recloser. Also, the heads of the adjustment screws protruded even farther beyond the surface of the timing block. This even further reduced the necessary clearances.

The timing blocks also suffered from the disadvantage that they included no means for preventing gross misadjustment. For example, it was not uncommon for the timing screws to be adjusted in the field to such an extent that there resulted a severe miscoordination with the other protective devices. Even where the screws were originally adjusted properly, it was found that the spring loaded screws frequently loosened over time due to the inherent vibration created by the flow of 60 Hz current through the apparatus. This could also lead to a loss of coordination.

Additionally, to properly adjust the trip times, in many instances, the screws had to be loosened to such an extent that they were barely engaging the threaded bore of the timing block. Due to improper handling or the vibration previously described, the screws could become unseated and fall out of their bores in the timing block. This would cause a shift in the time-current characteristic curve and possibly a loss in coordination with the other protective devices. The displaced screw and spring could also become lodged within the interrupter mechanism and create short circuits within the recloser or physically prevent the operating mechanism from opening or closing the contacts when required.

Accordingly, despite the long and successful use of hydraulically controlled reclosers, there remains a need in the art for a reliable means for adjusting the flows of hydraulic fluid to compensate for slight manufacturing variances, as well as to adjust the recloser to continue to meet the desired time-current characteristic curve as the characteristics of springs and other components of the control system change over time after extended use in the field. The adjustment means should provide a simple and effective method of adjusting the time-current characteristic curves, both at the factory and under field conditions. The apparatus should provide this adjustment without reducing the dielectric clearances that are necessary for safe and effective operation of the recloser, and should include a means for preventing the apparatus from shifting or falling out of adjustment during shipment, installation, or use. Additionally, the apparatus should be immune to vibration. It would be especially desirable if the device could be installed in the many thousands of existing reclosers now in use. Finally, it would be ideal if a means were provided for limiting the degree of adjustment so as to prevent excessive or gross misadjustment of the apparatus.

SUMMARY OF THE INVENTION

The present invention improves upon present day control valves and hydraulically controlled reclosers. According to the invention, there is provided a valve for adjustably controlling the flow of a hydraulic fluid. When used in a recloser, the valve may be employed to adjust the time required for the recloser to open the circuit it is protecting, and thereby to shift the time-current characteristic trip curve of the recloser. The valve includes a valve body and an adjustable selector retained within the valve body for changing the pressure at which the valve will open. The valve further includes limits or stops for providing limits to the range of adjustment.

In the preferred embodiment, the valve is a ball valve which includes a ball and spring housed in the valve body. The selector may be a spring retainer which is disposed in the valve body and which acts against the ball and spring to maintain the valve in a normally closed position. The spring retainer threadedly engages a threaded portion of the valve body so that by rotating the spring retainer, an incrementally greater or lesser force may be applied to the ball in the valve seat. The dimension of the threaded portion of the valve body limits the maximum amount of pressure which can be applied to the ball by the spring and spring retainer. Additionally, a washer disposed against a shoulder formed in the valve body adjacent the body's open end prevents the spring retainer from being withdrawn, thereby providing a limit to the minimum force that is applied to the ball.

The invention may additionally include a self-locking mechanism including an elastomeric seal disposed between the spring retainer and the valve body. Upon assembly, the seal is compressed and applies a radial force between the spring retainer and the valve body, preventing those members from vibrating or falling out of adjustment during shipment, installation or use.

Thus, the present invention comprises a combination of features and advantages which enable it to substantially advance the art relating to adjustable control valves and recloser control systems. The invention provides an adjustable valve having a self-locking feature which prevents fine adjustments from being lost during shipment, installation or use. The invention further includes adjustment limits for preventing field or service personnel from grossly misadjusting the valve and thereby causing a loss in coordination among the various protective devices in the circuit. The invention will provide these advantages without the use of timing blocks or other cumbersome and expensive components which have tended to decrease necessary dielectric clearances within the equipment enclosure. The invention may be easily and quickly installed by service personnel in a multitude of reclosers presently in service. These and various other characteristics and advantages of the present invention will be readily apparent to those skilled in the art upon reading the following detailed description and referring to the accompanying drawings.

BRIEF DESCRIPTION OF THE DRAWINGS

For a detailed description of a preferred embodiment of the invention, reference will now be made to the accompanying drawings wherein:

FIG. 4 is an elevational view of a portion of the control system of the recloser taken from the left side when viewed in respect to FIG. 1;

FIG. 5 is a sectional view taken on line 5—5 of FIG. 4, with parts broken away.

FIG. 6 is a side partial sectional view taken on line 6—6 of FIG. 5 showing the adjustable control valve of the present invention;

FIG. 7 is an end view of the control valve of FIG. 6;

DESCRIPTION OF THE PREFERRED EMBODIMENT

The recloser chosen for describing the preferred embodiment of the present invention is described in detail in U.S. Pat. No. 2,926,228 (the "'228 patent") which issued on Feb. 23, 1960, and which is incorporated herein by reference in its entirety. Because the recloser is described in such detail in the '228 patent, only the general features of the recloser will be described herein to the extent necessary for describing the situs and operation of the control valve of the present invention.

Figure 1:
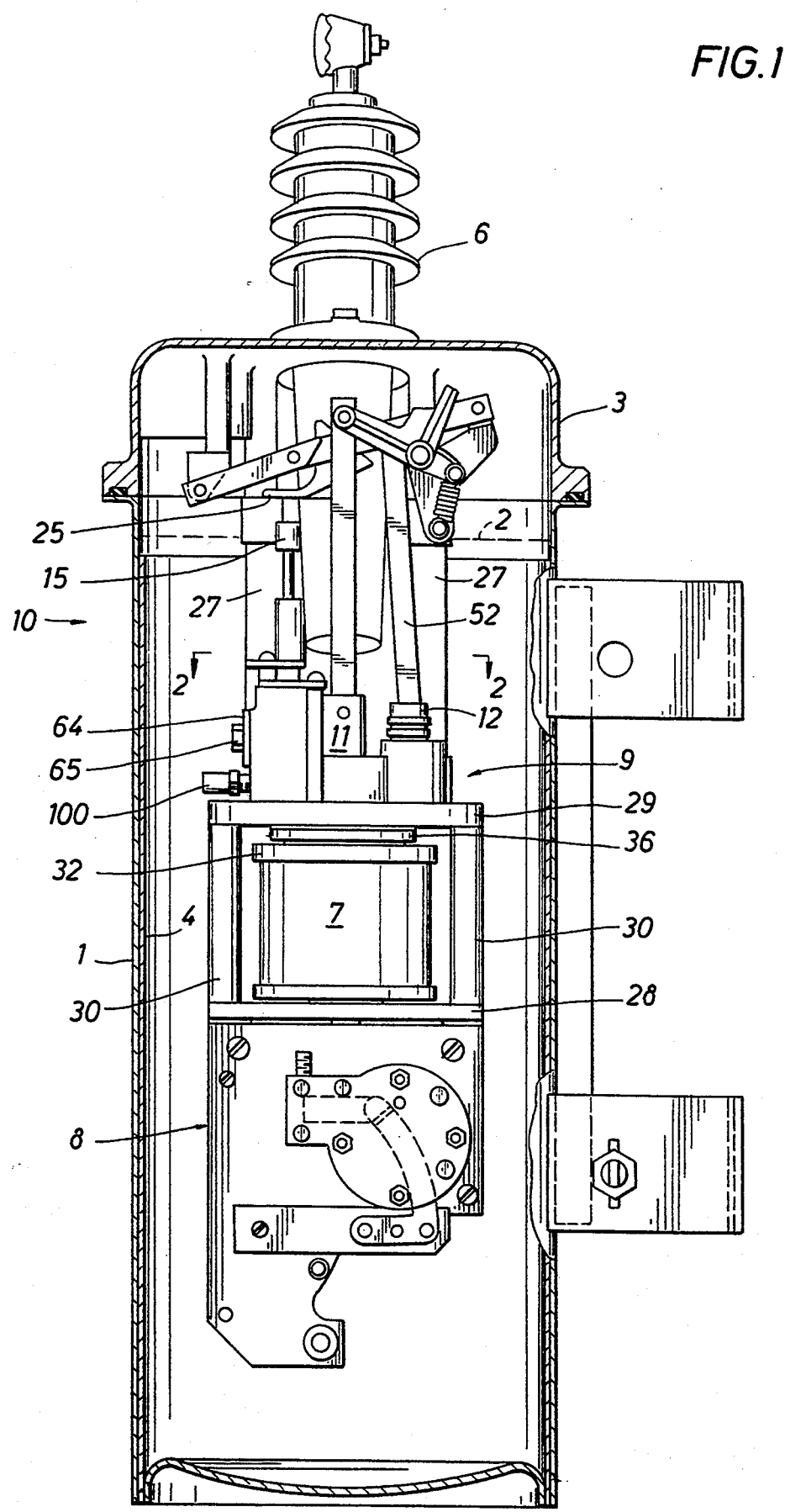
FIG. 1 is an elevational view, partly in cross section and with parts broken away, of a recloser embodying the present invention.

Referring now to FIG. 1, the single-phase recloser 10 generally comprises a metal tank 1 which houses interrupter or switch means 8 and a hydraulic control system 9. Tank 1 includes a metal gasketed cover 3 and an insulated liner 4. The control system 9 and switch means 8 are suspended from cover 3 by insulating stringers 27, two of which are shown in FIG. 1. The tank 1 is filled with a dielectric fluid, such as oil, to the level indicated by the dashed line 2. Cover 3 is provided with a pair of bushings 6, only one of which is shown in FIG. 1, for serially connecting the recloser 10 to a power line.

Control system 9 includes an electromagnetic solenoid or trip coil 7. The current path through the recloser 10 between the two bushings 6 comprises a series circuit through trip coil 7 and interrupting switch means 8. The lead wires extending through the bushings 6 and connecting coil 7 to switch means 8 in series are not shown for the sake of clarity. The operating sequence of the recloser 10 is governed by hydraulic control system 9 which utilizes the surrounding insulating oil in the timing and counting operations.

Figures 2, 3:
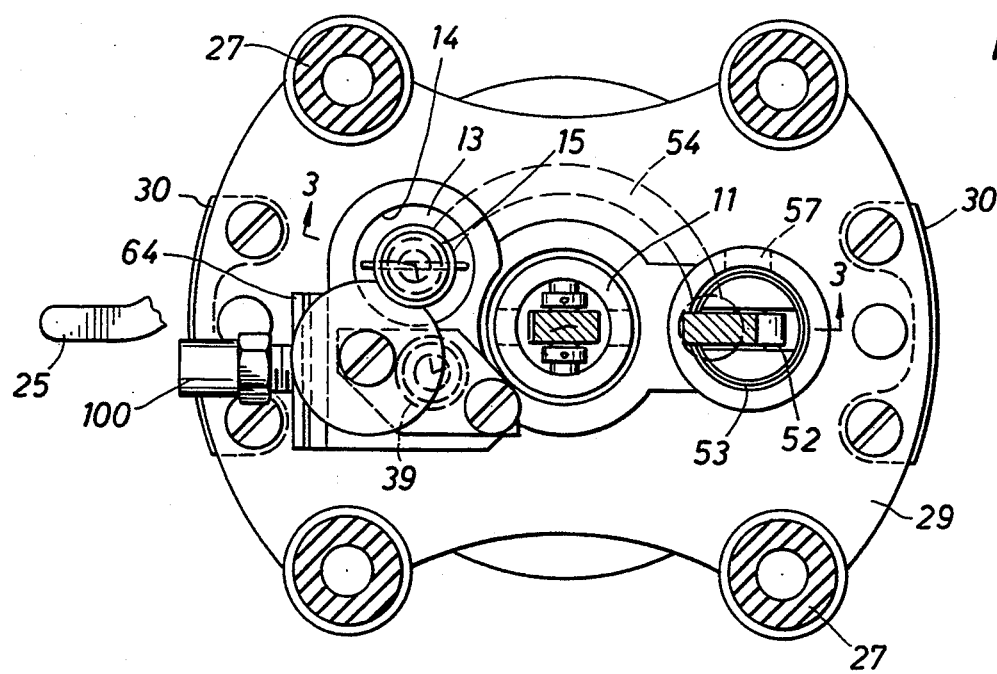
FIG. 2 is a top, plan view, partly in cross-section, taken on line 2—2 of FIG. 1, showing components comprising the hydraulic control system of the recloser.
FIG. 3 is an elevational view, partly in cross section, taken on the irregular broken line 3—3 in FIG. 2.

Referring now to FIGS. 1–3, control system 9 further includes a magnetic plunger 11, pump piston 12, integrating piston 13 and slide valve assembly 40. Coil 7 is interposed between a lower magnetic plate member 28 and an upper magnetic member 29 which are joined by vertical metal posts 30 for completing a magnetic circuit about coil 7. Plunger 11 is adapted to be drawn downwardly into coil 7 when a predetermined minimum trip current is conducted through coil 7. Coil 7 is wound on a flanged insulating spool 32 having central bore 33 (FIG. 3) which comprises a cylinder into which magnetic plunger 11 reciprocates during opening and closing operations. Connected to plunger 11 is a lower plunger rod 72. When plunger 11 is drawn downwardly into coil 7 in response to a predetermined trip current, plunger rod 72 actuates switch means 8 to open the contacts. When this occurs, the trip coil 7 is de-energized and, if lock-out has not occurred, spring means described in the '228 patent cause plunger 11 to return to its original position and cause contacts in switch means 8 to close.

Interposed between the upper face of ranged spool 32 and upper magnetic plate member 29 is annular ring 36 having bore 37. As best shown in FIG. 3, bore 37 is in fluid communication with plunger cylinder 33 of spool 32. A discharge orifice 38 fluidly interconnects slide valve cylinder 39 with plunger cylinder 33. When plunger 11 is attracted downwardly in response to an overcurrent conducted through coil 7, the hydraulic fluid in cylinder 33 is displaced and discharged through orifice 38 into slide valve cylinder 39.

Slide valve assembly 40 is disposed in cylinder 39 and normally biased by spring 42 against shoulder 41 (FIG.

5). Slide valve assembly 40 includes orifice 43 that is closed by a disc valve 44 under the influence of hydraulic pressure developed in slide valve cylinder 39 when plunger 11 descends. During opening operations of the recloser, fluid pressure developed by the descent of plunger 11 causes disc valve 44 to close orifice 43 and causes slide valve 40 to be elevated. When this occurs, escape orifice 45 opens, creating a fluid path from slide valve cylinder 39 to integrating piston cylinder 14, best shown in FIG. 3. Integrating piston cylinder 14 is open at its top so that the fluid discharged from escape orifice 45 is discharged into the tank 1.

Through various linkage members described in detail in the previously referenced '228 patent, plunger 11 and pump piston 12 are interconnected such that each time plunger 11 descends, pump piston 12 also descends and forces a definite quantity of fluid from pump cylinder 53 through a semi-circular duct 54 cast in the bottom of plate member 29, best shown in FIG. 2. In this manner, integrating piston cylinder 14 and pump cylinder 53 are in fluid communication via duct 54.

When the downward stroke of pump piston 12 is initiated, a predetermined amount of fluid is discharged through the bottom of cylinder 53 and into channel 54. A ball check valve 61 is included at the bottom of integrating piston cylinder 14 permitting ingress of fluid to cylinder 14 with each downward stroke of piston 12, but preventing discharge back into the duct 54. During a closely successive series of plunger 11 and pump piston 12 operations, the measured quantities of hydraulic fluid urge the integrating piston 13 upwardly in cylinder 14. If the successive series of interrupter operations do not terminate in a lockout, integrating piston 13 will slowly resettle to its original, lower most position as shown in FIG. 3 under the influence of return spring 62. During the step-by-step advancement of integrating piston 13, the piston closes escape orifice 45 and prevents discharge of fluid from slide valve cylinder 39. This produces back pressure and retards operation of plunger 11 and, accordingly, delays or retards the opening of the switch means 8 following the occurrence of a fault.

As explained in more detail below, during the delayed operation, disc valve 44 of slide valve assembly 40 closes orifice 43 in the slide valve body. Thus, the only escape for fluid during delay operations is through duct 68 and a timing orifice 67 in timing plate 64, or through control valve assembly 100, best shown in FIGS. 4 and 5. The relationship between the current passing through coil 7 and the time at which interrupter switch 8 opens, or in other words, the shape of the time-current characteristic curve of the recloser, may be preselected for coordination with other protective devices by varying the size of timing orifice 67. The means for conveniently varying the orifice size is provided by multi-apertured timing plate 64 secured against the wall of the slide valve cylinder 39 by cap screw 65 and positioned by index pin 66. The apertures 67 are of varying diameters and arranged for rotation into alignment with duct 68 which interconnects with the slide valve cylinder 39. Thus, when slide valve assembly 40 is urged upwardly during either fast or delayed interrupter operations, a certain quantity of fluid discharged by plunger 11 may be discharged through the prepositional timing orifice 67 to provide the selected time delay.

For permitting quicker plunger 11 response, such as during high magnitude faults, adjustable control valve 100 is provided. Referring now to FIGS. 5–7, control valve 100 generally comprises valve body 112, spring retainer 150, spring 180, and ball 190. Valve body 112 includes receiving portion 114 connected to threaded nipple 116 by shoulder portion 118. Preferably, valve body 112 is made of brass and includes a central axis 140. A bore 120 is formed along axis 140 in nipple portion 116. A coaxial bore 122 is formed in receiving portion 114 and intersects with bore 120 so as to form a fluid passageway through the entire length of valve body 112.

As best shown in FIGS. 5 and 6, the outer surface 136 of receiving portion 114 includes a raised collar 142. Collar 142 is hexagonal in cross section as shown in FIG. 7. Nipple portion 116 includes a threaded section 138 for threadedly engaging upper magnetic plate member 29 of control system 9. The hexagonal cross-section of collar 142 permits a wrench or similar tool to be disposed about receiving portion 114 so that valve body 112 may be threaded into bore 115 of plate member 29.

Receiving portion 114 generally includes inner cylindrical wall 128 extending from receiving end 126 of valve body 112 and terminating at tapered surface 130. Tapered surface 130 extends between bore 120 of nipple portion 116 and cylindrical wall 128 of receiving portion 114 and forms a seat for ball 190. A counterbore 133 is formed coaxially to bore 122 in wall 128 adjacent receiving end 126. Counterbore 133 forms an annular ledge or shoulder 134 retaining washer 170, as explained in more detail below. Inner wall 128 further includes a threaded segment 132 between shoulder 134 and tapered surface 130 for threadedly engaging spring retainer 150. Between tapered surface 130 and threaded segment 132 is an unthreaded surface 135.

Spring retainer 150, preferably made of steel, is disposed within valve body 112 and generally comprises base 152 and cylindrical side walls 160 extending from base 152 to end 161. Base 152 includes an orifice 156 centrally disposed through base 152 and coaxially aligned with valve axis 140. Formed in base 152 is a slot 158 which intersects orifice 156. Side walls 160 of retainer 150 include outer surface 162. Outer surface 162 includes a threaded portion 164 adjacent to base 152 and further includes an annular groove 166 formed in side wall 160 adjacent end 161. An interior chamber 163 is formed inside wall 160 for receiving spring 180.

Upon manufacture, ball 90 is seated within receiving portion 114 of valve body 112. Spring 180 is disposed within chamber 163 of spring retainer 150. An elastomeric annular member, preferably an "O" ring seal 168, is installed in groove 166 in the side wall 160 of retainer 150. Retainer 150 is then disposed within receiving portion 114 with threaded portion 164 of retainer 150 engaging threaded portion 132 of receiving portion 114. A screwdriver (not shown) or other tool is inserted into slot 158 of base 152 of spring retainer 154 for rotating retainer 150 so as to permit engagement with threaded portion 132 of receiving portion 114. Washer 170, which includes central aperture 172, is disposed in receiving portion 114 against shoulder 134. End 126 of receiving portion 114 is then machined or swaged over to form an annular lip 148 for retaining washer 170 against shoulder 134. Washer aperture 172 is smaller than the cross section of spring retainer 50 so as to prevent retainer 150 from being withdrawn from engagement with valve body 112 after assembly.

When the pressure inside slide valve cylinder 39 exceeds a certain predetermined value, control valve 100 is adapted to permit discharge of fluid from the slide valve cylinder 39 into tank 1. Thus, valve 100 acts as a safety relief and makes the time-current characteristic curve of the recloser faster in the range of high magnitude fault currents in instances when the recloser has already sequenced a number of times which has caused integrating piston 13 to block the escape orifice port 45.

Figure 12:
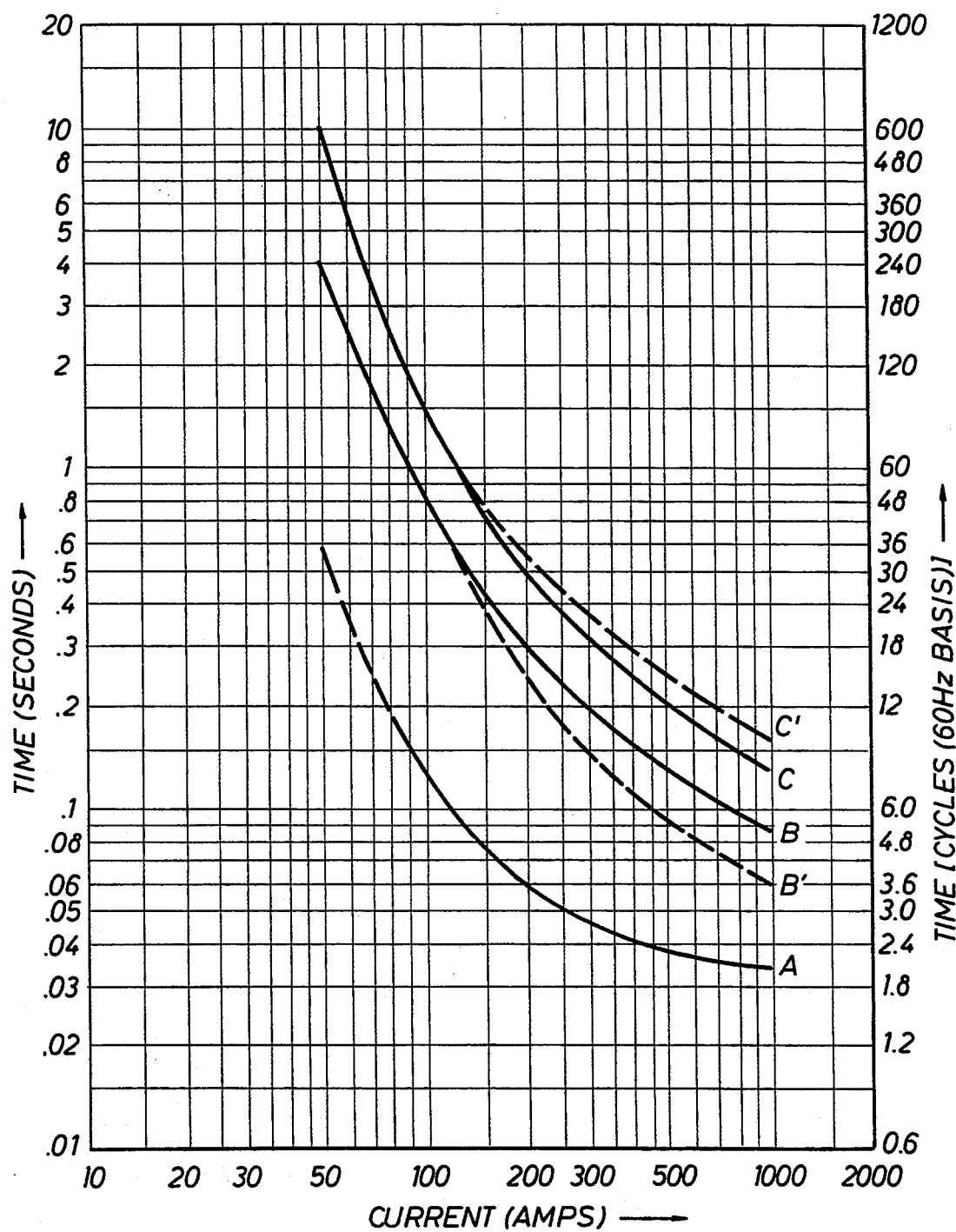
FIG. 12 is a diagram showing the time-current characteristic trip curves of the recloser of FIG. 1.

Referring briefly to FIG. 12, the time current characteristic trip curves for the recloser 10 are shown. Curve A shows the times required for recloser 10 to open the contacts in switch means 8 during "fast" operations where there is no time delay. Curves B and C are the time current characteristic trip curves for the recloser when it operates in the delayed or retarded mode. Either of curves B or C may be selected when recloser 10 is placed in service. The location of the knee of each curve, B and C, that is, the location where the slope of the curve abruptly changes, is dictated by the pressure required to open control valve 100.

A complete operating cycle of the recloser 10 will now be described with reference to FIGS. 8–12. In this explanation, it is assumed that the recloser has been set to provide two fast opening operations, to be followed by two delayed operations before lockout.

Fast Trip Operations

Figure 8:
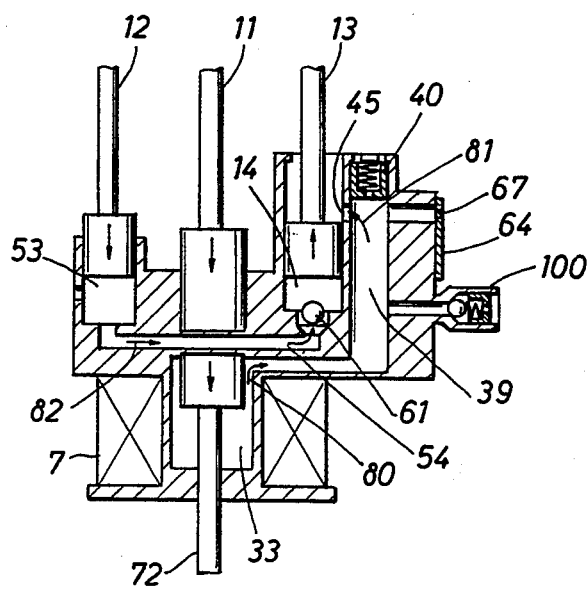
FIG. 8–11 are simplified flow diagrams illustrating the flow of hydraulic fluid through the control system of FIG. 3 corresponding with the various opening and closing operations of the recloser.

Referring first to FIG. 8, as the plunger 11 is drawn down by the trip coil 7, the connected plunger rod 72 trips the switch means 8 to open the contacts. At the same time, the plunger 11 displaces the oil in the plunger cylinder 33. The displaced oil travels along the path shown by arrows 80, raises the slide valve assembly 40, and escapes through escape orifice 45, as shown by arrow 81. The fluid displaced by plunger 11 escapes so rapidly through orifice 45 that there is very little impedance to the plunger's decent.

The pump piston 12 also moves downward with the movement of plunger 11 and forces a charge of oil under the integrating piston 13 along the path shown by arrow 82, thereby displacing piston 13 by a measured amount. Ball-check valve 61 retains the fluid charge in integrating piston cylinder 14.

The time current characteristic trip curve for this "fast" operation is represented by curve A on FIG. 12. The opening of the contacts by switch means 8 in accordance with curve A breaks the circuit and de-energizes the trip coil 7. Contact operating springs thereafter force the plunger 11 back to its normal position and close the contacts in switch means 8 as described in the '228 patent.

Figure 9:
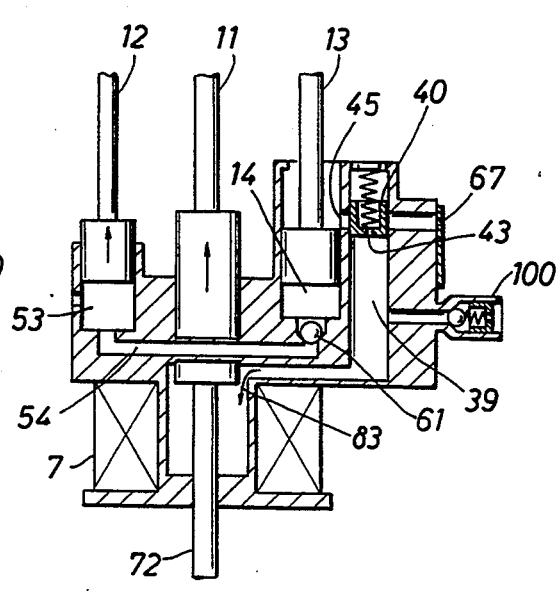

Referring now to FIG. 9, as the plunger 11 moves upward toward its normal position, oil is drawn back into the plunger cylinder 33 along the path shown by arrow 83, causing the slide valve 40 to move down and close off the escape orifice 45 to the cylinder 14. Thereafter, oil flows slowly through the small orifice 43 in the slide valve 40. This slow oil flow retards the return of the plunger 11 to its normal position, causing a delay of approximately 1 or 1½ seconds before the contacts close in switch means 8.

Figure 10:
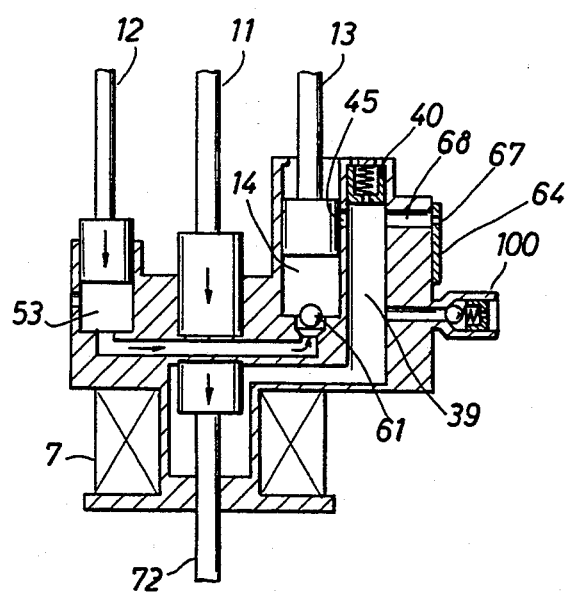

If the fault still exists after the contacts close, the recloser recycles. This second operation is similar to the first, except the second charge of oil from the pump piston 12 raises the integrating piston 13 high enough to block the escape orifice 45 in the slide-valve cylinder 39 as shown in FIG. 10.

Delayed Trip Operations

If the fault still exists after the contacts close the second time, the recloser again recycles. As shown in FIG. 10, during this third operation, travel of the plunger 11 down into the coil 7 is impeded by the oil. Oil displaced by the plunger 11 raises the slide valve assembly 40, but it cannot flow out through the blocked escape orifice 45. The oil must escape through duct 68 and orifice 67 in the timing plate 64. Slowing the downward movement of the plunger 11 causes a delay in opening the contacts by switch means 8 which produces the delayed trip operation illustrated by curves B and C in FIG. 12, one of which would be preselected when the recloser is placed in service.

During a delayed operation, if the fault current is high, enough pressure will be developed by the plunger 11 to open the spring-loaded control valve 100 and provide an additional escape port for the oil. This produces the inverse time-current characteristic of the delayed trip operation shown in curves B and C in FIG. 12. As the plunger 11 moves downward, pump piston 12 forces a third charge of oil under the integrating piston 14, raising it another measured amount in its cylinder.

Figure 11:
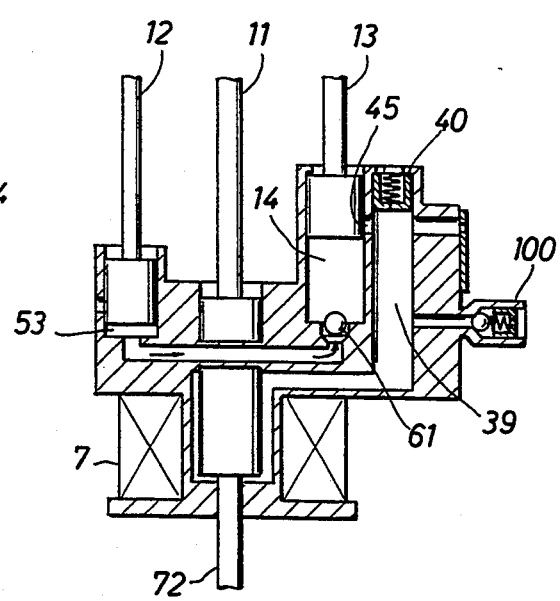

If the fault is still present after the third reclosure, the recloser performs a fourth and final operation. Referring now to FIG. 11, the fourth operation is another delayed trip operation similar to the third. However, the fourth charge of oil produced by the pump piston 12 raises the integrating piston 13 the remaining distance required to trip the lockout latch. As described in the '228 patent, this latch releases the toggle which holds open the contacts in switch means 8 until the toggle is reset by operating the manual operating handle on the recloser.

During lockout, the integrating piston 13, aided by return spring 62 (FIG. 3), settles to the bottom of cylinder 14. The recloser 10 is then ready to perform another operating sequence as soon as the contacts in switch means 8 are manually closed.

If a temporary fault clears before lockout occurs, all mechanical operations cease after the contacts have closed on the first successful reclosure. The integrating piston 13 settles to the bottom of cylinder 14 and the recloser 10 is ready to start another operating sequence when a fault again occurs. Settling of the integrating piston 13 enables the recloser 10 to "forget" that a temporary fault occurred.

Adjustment of Control Valve

As stated above, curves A–C of FIG. 12 are the time current characteristic trip curves that recloser 10 is designed to provide and that are published by the manufacturer. Nevertheless, due to minute variations in manufacturing tolerances, inconsistencies in the spring constant of springs used in control valves 100 or other variances occurring after perhaps years of service, the actual time current characteristic trip curve may tend to vary somewhat from those shown as curves A–C in FIG. 12. For example, curve B' on FIG. 12 may depict the actual time current trip curve of a recloser 10 where the delayed trip characteristic curve B was selected. Control valve 100 provides adjusting means for modifying the actual characteristic trip curve of the recloser so that it will precisely match the designed curves of B and C of FIG. 12.

Referring to FIGS. 6 and 7, to increase the pressure required to open value 100, a screwdriver is inserted in slot 158 of spring retainer 150. Spring retainer 150 is rotated clockwise as viewed in FIG. 7 so as to compress spring 180 and more securely seat ball 190 in value body 112. Increasing the pressure that is required to open control valve 100 has the effect of increasing the delay in the recloser's trip operation and thereby moves the knee of the actual trip curve upward. Thus, the recloser having a delayed trip characteristic curve B' may be adjusted to provide the desired curve B by rotating spring retainer 150 clockwise when viewed in FIG. 7. Likewise, decreasing the force supplied to ball 190 by turning spring retainer 150 in the counterclockwise direction as viewed in FIG. 7, decreases the delay and moves the knee of the curve downward as, for-example, from curve C' to curve C shown in FIG. 12. After each adjustment of valve 100, testing apparatus is used to measure the recloser trip times for given valves of test current and an actual time current characteristic trip curve is plotted and compared with the desired curve (B or C). If required, valve 100 may be adjusted further by making additional incremental adjustments to spring retainer 150 so that the desired trip curve may be obtained.

Aside from permitting incremental adjustment and more precise control over the time current trip characteristics of the recloser, the control valve 100 includes additional advantageous features. For example, washer 170 is fixed adjacent the end of receiving portion 140 of valve body 112 and forms a shoulder or stop member preventing spring retainer 150 from being accidentally removed or loosened to such an extent that it might fall out of engagement with valve body 112. Additionally, the length of threaded segments 132 and 164 of valve body 112 and retainer 150, respectively, combine to form a means for preventing spring retainer 150 from being overtightened which might prevent valve 100 from opening as required. In combination then, washer 170 and the threaded portions 132 and 164 provide limiting means for preventing the valve from being grossly misadjusted, both in terms of preventing the valve from opening too quickly or too slowly.

Additionally, valve 100 is substantially immune to a change in adjustment caused by the 60 Hz vibration which the recloser 10 must withstand. Seal 168 which is disposed between spring retainer 150 and valve body 112 is slightly compressed when valve 100 is manufactured. The elastomeric nature of the seal 168 imposes an axial force between spring retainer 150 and valve body 112. This force prevents the vibration that is inherent in electrical power equipment from causing the spring retainer 150 to be repositioned relative to the valve body, thereby preventing valve assembly 100 from falling out of adjustment.

While the preferred embodiment of this invention has been shown and described, modifications thereof can be made by one skilled in the art without departing from the spirit of the invention. The embodiment described herein is exemplary only and is not limiting. Many variations and modifications of the system and apparatus are possible and are within the scope of the invention. Accordingly, the scope of protection is not limited by the above description, but is only limited by the claims which follow, that scope including all equivalents of the subject matter of the claims.

What is claimed is:

1. A relief valve that opens in response to hydraulic pressure of a fluid, the valve comprising:
   a valve body having a central axis;
   a seat portion in said body, said valve body having a receiving end opposite said seat portion;
   a fluid passageway through said body;
   means for incrementally adjusting the pressure at which the valve opens and permits fluid to flow through said passageway, said adjusting means being disposed in its entirety within said passageway and aligned with said axis;
   means for retaining said adjusting means in said passageway of said valve body, said retaining means comprising a stop member disposed in said passageway at a location between said threaded member and said receiving end, said stop member having an aperture for conducting the fluid therethrough.

2. The valve of claim 1 wherein said incremental adjusting means comprises:
   a ball in said passageway
   a threaded surface on said valve body
   a threaded member in said passageway engaging said threaded surface of said valve body and adapted for movement within said passageway when said member is rotated;
   a means for biasing said ball against said seat portion, said biasing means disposed between said ball and said threaded member;
   a hole through said threaded member forming an orifice in fluid communication with said passageway.

3. The valve of claim 2 further comprising a means for limiting the movement of said threaded member toward said seat portion.

4. The valve of claim 3 wherein said limiting means comprises an unthreaded surface on said valve body between said threaded surface and said seat portion.

5. The valve of claim 1 wherein said retaining means comprises a tool-accommodating surface facing said receiving end, and wherein said stop member includes an aperture permitting access to said tool-accommodating surface from outside said valve body.

6. The valve of claim 1 further comprising a means for preventing said incremental adjusting means from vibrating out of adjustment.

7. The valve of claim 2 further comprising a means for preventing said threaded member from vibrating out of preselected position within said passageway.

8. The valve of claim 7 wherein said preventing means comprises an elastomeric member disposed between said threaded member and said valve body in said passageway.

9. A valve for controlling the flow of the fluid, the valve comprising:
   a valve body having a seat portion and a wall extending from said seat portion terminating at a receiving end of said valve body, said wall forming a receiving chamber in said body;
   means for selecting the pressure at which the valve will open, said selecting means being adjustable within a predetermined range and being disposed entirely with said receiving chamber such that no portion of said selecting means extends beyond said receiving end; and
   means for retaining said adjustable selecting means within said body, said retaining means comprising a stop member disposed in said receiving chamber between said seat portion and said receiving end; and
   means for limiting the distance into said body that said selecting means may be said disposed;
   selecting means comprising:
   a ball;
   a spring retainer having a tool-accommodating surface facing said receiving end;

an aperture in said stop member for permitting a tool to access said tool accommodating surface of said spring retainer;

a spring disposed between said ball and said retainer;

wherein said spring retainer threadedly engages said valve body; and wherein rotating said spring retainer alters the force applied to said ball by said spring.

10. The valve of claim 9 further comprising means for preventing said selecting means from moving within said body after the opening pressure has been selected.

11. The valve of claim 10 wherein said preventing means comprises an elastomeric annular member disposed in said body between the opposing surfaces of said spring retainer and said body.

12. The valve of claim 9 wherein said limiting means comprises:

a threaded segment on the inner surface of said valve body between said receiving end and said seat portion; and an unthreaded segment on the inner surface of said valve body between said threaded segment and said seat portion.

* * * * *